T. VAN DYKE.
Journal for Balance-Wheel.
No. 161,915. Patented April 13, 1875.
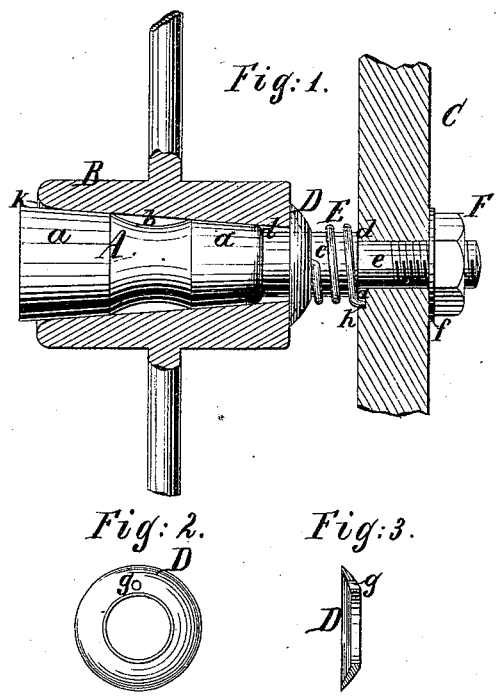
Witnesses: Inventor:
Thomas Van Dyke
by his attorney
Thomas D. Stetson

UNITED STATES PATENT OFFICE.

THOMAS VAN DYKE, OF NEW YORK, N. Y.

IMPROVEMENT IN JOURNALS FOR BALANCE-WHEELS.

Specification forming part of Letters Patent No. 161,915, dated April 13, 1875; application filed February 12, 1875.

*To all whom it may concern:*

Be it known that I, THOMAS VAN DYKE, of the city, county, and State of New York, have invented Improvements relating to Automatic Spring-Journals, of which the following is a specification:

Wherever it has been found necessary to set a balance-wheel upon a fixed shaft, instead of keying it to a shaft playing in journals at each end—as, for instance, in several descriptions of lathe, certain varieties of portable engines, and notably in sewing-machines—the friction of the wheel upon the axle has very soon induced a wavering and intermittent motion fatal to all regularity. Among the various devices for obviating this loose play, several patents have already been issued for axles of a conical shape, the shoulders susceptible of approximation by screws and nuts, or compressing-screws, at either the outer or inner end. These axles have also been made with a hollow at the center of the bearing to better retain the lubricating-oil. All these methods are open to the objection that, while obviating the difficulty before mentioned, the process of so doing is accomplished by manual adjustment, and the necessary stoppage of all machinery run by such fly-wheels.

By experiment and practical observation I have found that a short axle, when made in a conical shape, the smaller end toward the support, seems best calculated to overcome the continually loose play of the bearing, provided the wheel be continually kept as far out on the shaft as possible. Upon the end of a conical pin I turn a short spindle, joining, by a shoulder, the threaded shank of the axle. Putting this shank through the frame, (in the case of a sewing-machine this frame will be one of the legs of the table,) I tighten up a nut upon the thread at the back of the frame, making a rigid connection between support and axle, which is prevented from penetrating too far by the before-mentioned shoulder. The hub of the wheel, placed upon the pin, is prevented from moving off it by the conical shape, but at the same time is pushed outward by a washer, backed by a spring coiled about the spindle. One end of this spring, slightly bent, engages in a hole in the washer—the other, also bent, in a hole in the frame. The tension of the spring prevents the revolution of the washer in either direction. By this invention I secure an even, tight, and self-adjusting bearing upon the drum, and a pressure firm, yet eminently elastic, tending automatically to its preservation. As the outer edges of an ordinary axle-hole, being right angles, tend to wear any conical surface upon which they are forced into a succession of ridges, I ream out for a short distance the outer lip of the hole in the hub, and avoid all uneven wear. For the same purpose the shoulder between the conical part and the spindle is also rounded.

This invention relates to certain improvements in the fly-wheels or balance-wheels for driving light machinery, and is especially designed to be used in sewing-machines, lathes, and other machinery driven by power.

The balance-wheels of such machines have usually been mounted permanently upon a crank-shaft journaled at each end to the supports or legs of the table or stand which supports the machine. As thus constructed, said shaft occupies a most inconvenient position, being directly in the way of the knees or legs of the operator, interfering with the freedom thereof while working, and soiling and wearing the clothes. These objections have been notably experienced in the earlier sewing-machines, and attempts have been made to obviate the same by mounting the wheel on a short stationary pin attached at one end to one of the supports or legs of the table or stand, the crank being formed upon one of the spokes or arms of the wheel, so as to leave the space under the table perfectly clear and free. Such devices, however, have proved objectionable, owing to the rapidity with which the wheel works loose upon its journal, and various expedients have been resorted to to remedy this objection, by forming a conical bearing for the wheel at one or both ends of the journal, by means of which device said wheel may be adjusted when worn. These have in a measure answered the desired purpose; but still, in the use of the same, it has been necessary to adjust the wheel from time to time by hand, which necessitates a stoppage of machinery, and the exercise of a certain degree of mechanical ingenuity and skill, which is not usually possessed by the operators of such machines, especially in the case of sewing-machines, which are usually worked by women.

The object of this invention is to overcome these difficulties, and provide a journal upon which the fly-wheel will be automatically adjusted when worn, as will be more fully hereinafter set forth; and it consists in a conical pin or journal, secured at one end to one of the supports of table or stand, upon which the wheel is mounted and revolves, the hub of the wheel having a conical bore to correspond with the shape of the pin or journal, and being pressed upon the same by means of a spring connected with a concave washer bearing against the end of the hub.

In the drawings, Figure 1 represents a sectional view of my invention; and Figs. 2 and 3, detached views of a portion of the same.

Referring to the drawings, A represents the conical pin or journal, securely fastened to the support C by means of the screw-nut F, the end of said pin passing through said support, the shoulder $d$ of the same resting against the inner side, as shown. B represents the hub of the wheel, conically bored, and adapted to fit and revolve upon the conical pin A. Said pin is recessed for any desirable portion of its length, as shown at $b$, to reduce the friction bearing surface and hold the lubricant. D represents a concave washer, setting against the end of hub of the wheel B, forming a bearing for the coiled spring E, which is secured thereto by passing one end of the same into an aperture, $g$, provided for the purpose, the other end of said spring being held in a similar aperture, $h$, in the support C. The outer edge of the aperture through the hub is reamed out or beveled, as shown at K, to prevent the same from wearing and injuring the journal, and also to diminish friction. The hub B of the wheel, being continually pressed forward upon the pin or journal A by the action of the coiled spring, keeps the conical bearing-surfaces of the wheel and pin always together, thus automatically adjusting and compensating for wear.

I claim as my invention—

1. The fly-wheel B, mounted upon the conical stud A, in combination with the washer D and spring E, for the purpose of pressing the hub forward upon the stud, and automatically compensating for wear, as specified.

2. The hub B, reamed or rounded off at its larger aperture K, to prevent cutting or defacing the conical stud A, upon which said hub revolves, substantially as set forth.

In testimony whereof I have hereunto set my hand this 10th day of February, 1875, in the presence of two subscribing witnesses.

THOMAS VAN DYKE.

Witnesses:
WM. C. DEY,
HENRY GENTNER.